(12) United States Patent
McCarville et al.

(10) Patent No.: US 9,090,028 B2
(45) Date of Patent: Jul. 28, 2015

(54) METHOD FOR PRODUCING CONTOURED COMPOSITE STRUCTURES AND STRUCTURES PRODUCED THEREBY

(75) Inventors: Douglas A. McCarville, Orting, WA (US); Patrick B. Stickler, Everett, WA (US); Juan C. Guzman, Seattle, WA (US); Jennifer S. Noel, Kent, WA (US); Joseph L. Sweetin, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 414 days.

(21) Appl. No.: 12/104,529

(22) Filed: Apr. 17, 2008

(65) Prior Publication Data

US 2009/0261199 A1   Oct. 22, 2009

(51) Int. Cl.
| | | |
|---|---|---|
| *B29C 70/44* | (2006.01) | |
| *B32B 37/10* | (2006.01) | |
| *B29C 70/34* | (2006.01) | |
| *B29C 70/30* | (2006.01) | |
| *B29C 70/38* | (2006.01) | |
| *B29L 31/30* | (2006.01) | |

(52) U.S. Cl.
CPC ............... *B29C 70/44* (2013.01); *B29C 70/30* (2013.01); *B29C 70/34* (2013.01); *B29C 70/38* (2013.01); *B32B 37/10* (2013.01); *B32B 37/1018* (2013.01); *B29L 2031/3082* (2013.01); *Y02T 50/433* (2013.01); *Y10T 156/1002* (2015.01)

(58) Field of Classification Search
CPC  B29C 43/203; B29C 53/36; B29C 2791/001; B29C 2791/02; B29C 70/30; B29C 70/38; B29C 70/207; B29C 70/44; B29C 70/443; B29C 70/40; B32B 5/12; B32B 5/28; B32B 5/26; B32B 37/10; B32B 37/18; B32B 37/16; B32B 37/1018
USPC .......... 156/285, 381; 264/510, 511, 522, 544, 264/547, 553, 554
See application file for complete search history.

(56) References Cited

U.S. PATENT DOCUMENTS

| | | | |
|---|---|---|---|
| 3,042,562 | A | 7/1962 | Peterson et al. |
| 3,259,021 | A | 7/1966 | Appleton et al. |
| 3,556,922 | A | 1/1971 | Green et al. |
| 3,775,219 | A | 11/1973 | Karlson et al. |
| 4,133,711 | A | 1/1979 | August et al. |

(Continued)

FOREIGN PATENT DOCUMENTS

| | | |
|---|---|---|
| DE | 3223231 A1 | 1/1983 |
| DE | 3249987 C2 | 8/1995 |

(Continued)

OTHER PUBLICATIONS

International Preliminary Report on Patentability, dated Jul. 30, 2013, regarding Application No. PCT/US2011/066763, 6 pages.

(Continued)

*Primary Examiner* — Christopher Schatz
(74) *Attorney, Agent, or Firm* — Yee & Associates, P.C.

(57) ABSTRACT

A method is provided for forming a composite part contoured along its length and having at least one leg. The method includes forming a stack of fiber reinforced, pre-preg plies by laying down individual segments of unidirectional fibers in each ply. Each of the segments is placed in a preselected orientation related to the contour of the part. The leg is formed by bending a portion of the stack over a tool.

18 Claims, 10 Drawing Sheets

(56) References Cited

U.S. PATENT DOCUMENTS

| | | | |
|---|---|---|---|
| 4,208,238 A | 6/1980 | August et al. | |
| 4,249,704 A | 2/1981 | Sakaue et al. | |
| 4,305,903 A | 12/1981 | Krause | |
| 4,475,976 A | 10/1984 | Mittelstadt et al. | |
| 4,541,886 A | 9/1985 | Marlow et al. | |
| 4,576,849 A | 3/1986 | Gardiner | |
| 4,588,466 A | 5/1986 | Eaton | |
| 4,591,402 A | 5/1986 | Evans et al. | |
| 4,696,707 A | 9/1987 | Lewis et al. | |
| 4,707,214 A | 11/1987 | Nithart et al. | |
| 4,720,255 A | 1/1988 | Mittelstadt | |
| 4,726,924 A | 2/1988 | Mittelstadt | |
| 4,750,965 A | 6/1988 | Pippel et al. | |
| 4,847,063 A | 7/1989 | Smith | |
| 4,867,834 A | 9/1989 | Alenskis et al. | |
| 4,955,803 A | 9/1990 | Miller et al. | |
| 5,038,291 A | 8/1991 | Wang et al. | |
| 5,242,523 A * | 9/1993 | Willden et al. | 156/285 |
| 5,292,475 A | 3/1994 | Mead et al. | |
| 5,431,749 A | 7/1995 | Messner | |
| 5,431,984 A | 7/1995 | Keck et al. | |
| 5,492,979 A | 2/1996 | Pater | |
| 5,538,589 A * | 7/1996 | Jensen et al. | 156/581 |
| 5,648,109 A | 7/1997 | Gutowski et al. | |
| 6,355,133 B1 | 3/2002 | Williams | |
| 6,451,152 B1 | 9/2002 | Holmes et al. | |
| 6,454,893 B1 | 9/2002 | McKague, Jr. | |
| 6,547,910 B1 | 4/2003 | Benzing et al. | |
| 6,595,467 B2 | 7/2003 | Schmidt | |
| 6,613,258 B1 | 9/2003 | Maison et al. | |
| 6,648,273 B2 | 11/2003 | Anast | |
| 6,723,271 B2 | 4/2004 | Hemphill et al. | |
| 7,008,580 B2 | 3/2006 | Eberth et al. | |
| 7,056,402 B2 | 6/2006 | Koerwien et al. | |
| 7,115,180 B2 | 10/2006 | Bruyere | |
| 7,134,629 B2 | 11/2006 | Johnson et al. | |
| 7,137,182 B2 | 11/2006 | Nelson | |
| 7,175,795 B2 | 2/2007 | Eberth et al. | |
| 7,469,735 B2 | 12/2008 | Brown et al. | |
| 7,513,769 B2 | 4/2009 | Benson et al. | |
| 7,527,222 B2 | 5/2009 | Biornstad et al. | |
| 7,544,261 B1 * | 6/2009 | Nogueroles Vines et al. | 156/202 |
| 7,670,525 B2 | 3/2010 | Weidmann et al. | |
| 7,790,082 B2 | 9/2010 | Buge et al. | |
| 7,842,145 B2 | 11/2010 | Hogg | |
| 7,943,076 B1 | 5/2011 | Hawkins et al. | |
| 2002/0149134 A1 | 10/2002 | Hemphill et al. | |
| 2003/0168775 A1 | 9/2003 | Eberth et al. | |
| 2003/0173019 A1 | 9/2003 | Eberth et al. | |
| 2004/0074587 A1 | 4/2004 | Koerwien et al. | |
| 2005/0056362 A1 | 3/2005 | Benson et al. | |
| 2005/0067731 A1 | 3/2005 | Bruyere | |
| 2005/0263645 A1 | 12/2005 | Johnson et al. | |
| 2006/0073309 A1 | 4/2006 | Hogg | |
| 2006/0216480 A1 | 9/2006 | Weidmann et al. | |
| 2006/0216490 A1 | 9/2006 | Ishii et al. | |
| 2006/0249868 A1 | 11/2006 | Brown et al. | |
| 2007/0029038 A1 | 2/2007 | Brown et al. | |
| 2007/0161483 A1 * | 7/2007 | Raf | 493/296 |
| 2007/0175575 A1 | 8/2007 | Rubin et al. | |
| 2008/0230652 A1 | 9/2008 | Biornstad et al. | |
| 2009/0139644 A1 | 6/2009 | Nogueroles et al. | |
| 2009/0263618 A1 | 10/2009 | McCarville et al. | |
| 2011/0097554 A1 | 4/2011 | Kehrl et al. | |
| 2012/0076973 A1 | 3/2012 | Guzman et al. | |

FOREIGN PATENT DOCUMENTS

| | | |
|---|---|---|
| EP | 0496695 A2 | 7/1992 |
| EP | 1666353 A1 | 6/2006 |
| EP | 1800840 A1 | 6/2007 |
| EP | 1804146 A1 | 7/2007 |
| EP | 1995040 A1 | 11/2008 |
| EP | 1995046 A2 | 11/2008 |
| EP | 2233625 A1 | 9/2010 |
| FR | 2515106 A1 | 4/1983 |
| FR | 2635484 A1 | 2/1990 |
| GB | 763972 A | 12/1956 |
| GB | 2467417 A | 8/2010 |
| JP | 2003317547 A | 11/2003 |
| JP | 2004276393 A | 10/2004 |
| WO | 9922932 A1 | 5/1999 |
| WO | 03099545 A1 | 12/2003 |
| WO | 2005011961 A1 | 2/2005 |
| WO | WO2006070015 A1 | 7/2006 |
| WO | 2006119002 A2 | 11/2006 |
| WO | WO2006136560 A1 | 12/2006 |
| WO | 2007018935 A1 | 2/2007 |
| WO | W02007074179 A1 | 7/2007 |
| WO | 2009129007 A2 | 10/2009 |
| WO | PCT US2009/ 037073 | 10/2009 |
| WO | 2010101741 A2 | 9/2010 |

OTHER PUBLICATIONS

Notice of Allowance, dated Aug. 16, 2013, regarding USPTO U.S. Appl. No. 11/119,756, 16 pages.
Amendment after USPTO Office Action dated Oct. 18, 2011 for U.S. Appl. No. 12/396,418, pp. 25.
USPTO Final Office Action dated Dec. 30, 2011 for U.S. Appl. No. 12/396,418, pp. 9.
USPTO Office Action dated Jul. 19, 2011 for U.S. Appl. No. 12/396,418, pp. 11.
USPTO Restriction Requirement dated Apr. 4, 2011 for U.S. Appl. No. 12/396,418, pp. 7.
Response to USPTO Restriction Requirement dated May 2, 2011 for U.S. Appl. No. 12/396,418, pp. 9.
USPTO Office Action dated Oct. 18, 2011 for U.S. Appl. No. 12/776,781, pp. 18.
USPTO Restriction Requirement dated Jul. 15, 2011 for U.S. Appl. No. 12/776,781, pp. 6.
Response to USPTO Restriction Requirement dated Aug. 15, 2011 for U.S. Appl. No. 12/776,781, pp. 11.
PCT Search Report dated Nov. 5, 2010 by applicant the Boeing Company, application No. PCT/US2010/025110, pp. 11.
Klenner, "Evaluation and Selection Algorithms of Cost-Optimised Prepreg Application Methods in the Context of Manufacturing Highly Stressed Aircraft Components of Fibre-Reinforced Plastic," Doctoral Dissertation, Technische Universitat Carolo-Wilhelmina zu Braunschweig (DE), Apr. 5, 1988, pp. 9, 18-25, 55-56, 64-68, & 154-156.
Office Action, dated Jun. 3, 2013, regarding USPTO U.S. Appl. No. 13/684,988, 25 pages.
Office Action, dated May 23, 2013, regarding USPTO U.S. Appl. No. 13/013,097, 42 pages.
Amendment Pursuant to Request for Continued Examination, dated Aug. 9, 2012, regarding U.S. Appl. No. 12/776,781, 6 pages.
USPTO Notice of Allowance, dated Aug. 17, 2012, regarding U.S. Appl. No. 12/776,781, 10 pages.
International Search Report, dated Apr. 16, 2012, regarding Application No. PCT/US2011/066763, 13 pages.
USPTO final office action dated May 16, 2012 regarding U.S. Appl. No. 12/776,781, 26 Pages.
Dickson et al., "Design and Analysis of a Stiffened Composite Fuselage Panel," NASA Contractor Report 159302, Aug. 1980, 52 pages.
"Fabrics and Preforms," In: ASM Handbook vol. 21: Composites, Miracle et al. (Eds.), ASM International, Materials Park, OH, pp. 64-65, Dec. 2001.
International Search Report dated Oct. 31, 2006, regarding Application No. PCT/US2006/027067 (WO2007018935), 2 pages.
International Search Report dated Feb. 15, 2007, regarding Application No. PCT/US2006/016191 (WO2006119002), 6 pages.
International Search Report dated May 10, 2010, regarding Application No. GB1000777.1 (GB2467417), 6 pages.
Shirinzadeh et al., Trajectory for Open-Contoured Structures in Robotic Fibre Placement, Robotics and Computer-Integrated Manufacturing, 23(4):380-394, Mar. 2007.

(56) References Cited

OTHER PUBLICATIONS

USPTO Office Action, dated Dec. 23, 2008, regarding U.S. Appl. No. 11/119,756, 13 pages.
USPTO Final Office Action, dated Jun. 18, 2009, regarding U.S. Appl. No. 11/119,756, 13 pages.
USPTO Office Action, dated Sep. 28, 2010, regarding U.S. Appl. No. 11/119,756, 18 pages.
USPTO Final Office Action, dated Feb. 14, 2011, regarding U.S. Appl. No. 11/119,756, 14 pages.
USPTO Office Action, dated Sep. 19, 2011, regarding U.S. Appl. No. 11/119,756, 14 pages.
USPTO Final Office Action, dated Feb. 29, 2012, regarding U.S. Appl. No. 11/119,756, 17 pages.
USPTO Office Action, dated Mar. 5, 2008, regarding U.S. Appl. No. 11/195,786, 15 pages.
USPTO Notice of Allowance, dated Aug. 25, 2008, regarding U.S. Appl. No. 11/195,786, 7 pages.
USPTO Office Action, dated Nov. 8, 2010, regarding U.S. Appl. No. 12/363,746, 17 pages.
USPTO Notice of Allowance, dated Mar. 29, 2011, regarding U.S. Appl. No. 12/363,746, 8 pages.
Response to Office Action, dated Feb. 21, 2012, regarding U.S. Appl. No. 12/776,781, 31 pages.
Response to Final Office Action, dated Mar. 30, 2012, regarding U.S. Appl. No. 12/396,418, 16 pages.
Office Action, dated Jan. 11, 2013, regarding USPTO U.S. Appl. No. 11/119,756, 38 pages.
Kehrl et al., "Curved Composite Frames and Method of Making the Same," USPTO U.S. Appl. No. 13/684,988 and Preliminary Amendment, filed Nov. 26, 2012, 71 pages.
European Patent Office Communication, dated Oct. 14, 2009, regarding Application No. EP06769909.0, 3 pages.
Office Action, dated Feb. 25, 2014, regarding USPTO U.S. Appl. No. 12/396,418, 45 pages.
Final Office Action, dated Nov. 19, 2013, regarding USPTO U.S. Appl. No. 13/013,097, 24 pages.
Final Office Action dated Dec. 6, 2013, regarding USPTO U.S. Appl. No. 13/684,988, 14 pages.
Fabrics and Preforms, In: ASM Handbook vol. 21: Composites, Miracle et al. (Eds.), ASM International, Materials Park, OH, pp. 64-65, Dec. 2001.
Office Action, dated May 21, 2014, regarding USPTO U.S. Appl. No. 13/013,097, 13 pages.
Notice of Allowance, dated Sep. 5, 2014, regarding USPTO U.S. Appl. No. 12/396,418, 16 pages.
Office Action dated Dec. 4, 2014, regarding USPTO U.S. Appl. No. 13/684,988, 18 pages.
Final Office Action, dated Dec. 31, 2014, regarding USPTO U.S. Appl. No. 13/013,097, 18 pages.
Chinese Patent Office Action and English Translation, dated Dec. 29, 2014, regarding Application No. 201180065977.6, 17 pages.
Japanese Patent Office Action and English Translation, dated Apr. 7, 2015, regarding Application No. 2011-505058, 5 pages.

\* cited by examiner

METHOD FOR PRODUCING CONTOURED COMPOSITE STRUCTURES AND STRUCTURES PRODUCED THEREBY

TECHNICAL FIELD

This disclosure generally relates to techniques for fabricating composite parts, and deals more particularly with a method for producing highly contoured non-Cartesian coordinate composite structures using unidirectional pre-impregnated composite materials, especially structures such as frame sections having multiple legs.

BACKGROUND

Highly contoured components used in the aerospace industry including but not limited to frames, spars, ribs and stringers are typically made out of lightweight metal, such as aluminum. Metal fabrication processes such as, without limitation casting, forming, rolling and machining are well suited for fabricating highly contoured composite components with complex shapes. In spite of the trend toward replacing metal components with composites, few methods exist for fabricating continuous multi-leg shapes with complex contours that are needed for large commercial and military aircraft.

Existing methods for making highly contoured composite components are generally limited to hand layup techniques, braid/resin infusion fabrication, and the use of automated fiber placement (AFP) machines, however each of these techniques has disadvantages. For example, hand layup requiring manual placement of narrow bands of material into multi-leg shapes is both costly and time consuming, and may therefore only be suitable for prototyping activities and small production runs. Similarly, a known technique in which fibers are braided to form contoured shapes and then infused with resin is also time consuming and may produce components that exhibit qualities not suited to high performance applications, including added weight. Finally, the use of AFP machines may not be efficient for use in producing highly contoured, multi-leg components with tight radii because these structural features require the machine to start and stop and change direction relatively frequently. Moreover, certain component configurations such as those containing a Z or a J-cross section may not be fabricated using AFP machines because they may not be able to lay material in the inside corners of these components.

Accordingly, there is a need for a method of fabricating contoured and especially highly contoured, continuous composite structures containing multi-leg features that meet high performance specifications in a high volume production environment.

SUMMARY

The disclosed embodiments provide a method of fabricating highly contoured, continuous composite structures using unidirectional pre-preg composite materials. The method provides for unlimited orientation of plies with low distortion, consistent resin/fiber content and smooth surfaces. The resulting composite structures are lightweight and exhibit accurate feature placement which facilitates superior fit-up during aircraft assembly processes. The disclosed methods may be employed to fabricate a wide range of structures including, but not limited to shear ties, stringers, spars and ribs for aircraft and other vehicles.

Continuous, contoured composite structures may be fabricated in which fiber tows and narrow tape bands are placed, aligned and formed in a manner so as to maintain polar fiber orientation during the fabrication of highly curved, multi-leg composite structures, such as frames, spars, ribs and stringers. The method employs room temperature drape forming, fiber steering, advanced fiber tow and tape placement and tension controlled hot drape forming. The use of unidirectional pre-preg and highly accurate fiber placement without distortion results in structures that are lower in weight compared to structures fabricated using alternate methods.

According to one disclosed embodiment, a method is provided of forming a composite part contoured along its length and having at least one leg, comprising: forming a stack of fiber reinforced, pre-preg plies by laying down individual segments of unidirectional fibers in each ply, including placing each of the segments in a preselected orientation related to the contour of the part; and, forming the at least one leg by bending a portion of the stack over a tool. Forming the stack may include forming individual tapered segments of the unidirectional fibers, and placing the segments. This may include orienting the longitudinal axis of each of the tapered segments generally parallel to a radial coordinate defining the contour of the part. The individual segments may be laid down by an AFP machine which may also be used to lay down unidirectional fibers along the length of the part, generally transverse to the fiber orientation of the individual segments. Bending the pre-preg ply stack to form the leg may be performed by drape forming.

According to another disclosed embodiment, a method is provided of forming a contoured composite frame section comprising: forming a flat stack of fiber reinforced, pre-preg plies, including individually placing fiber segments in at least certain of the plies in a preselected polar orientation; forming a first leg of the frame section; and compacting and curing the formed stack. Placing the fiber segments may include tapering the pattern of the fibers in each of the segments. Placing the fiber segments may be performed by an AFP machine in which fiber tape wedges are placed in side-by-side relationship to each other.

According to a further embodiment, a method is provided of fabricating a curved composite frame section having a cross section including at least one leg extending along the length of the frame section. The method comprises: forming a stack of fiber reinforced pre-preg plies using an AFP machine, including laying down segments of unidirectional fibers having axes of orientation generally aligned with a radial coordinate defined by the curvature of the frame section, and laying down courses of unidirectional fibers along the length of the frame section; forming the at least one leg along an edge of the stack by vacuum forming the stack on a tool; and, compacting and curing the vacuum formed stack. Laying down the segments of unidirectional fibers may be performed by placing segments in side-by-side relationship along a length of the stack. The method may further comprise forming a plurality of spaced apart cut outs along an edge of the stack.

The disclosed embodiments satisfy the need for an efficient and reliable method of fabricating highly contoured composite structures having continuous legs.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
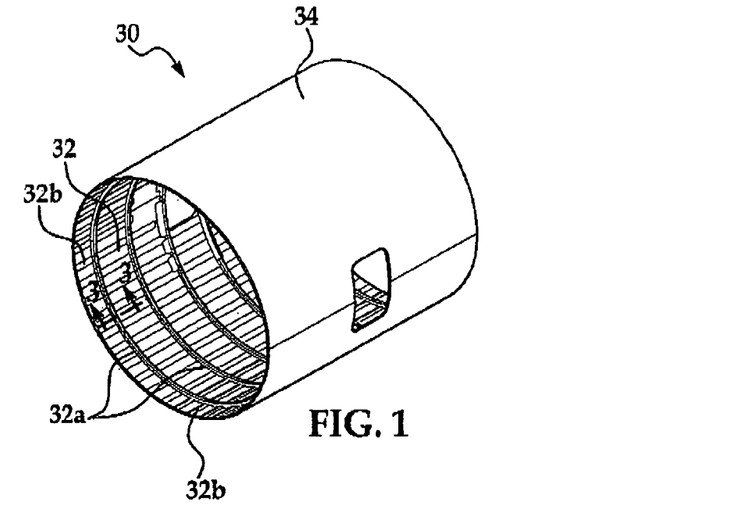
FIG. 1 is a perspective view of a barrel section of an aircraft fuselage.
Figure 2:
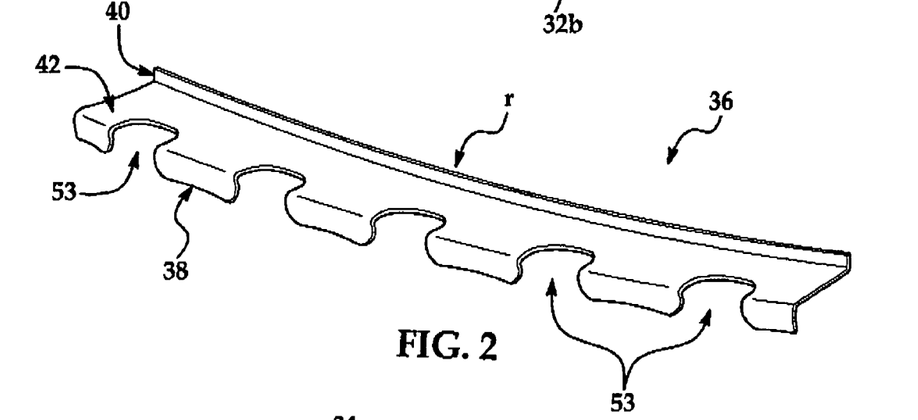
FIG. 2 is a perspective view of a highly contoured composite frame section used in the fuselage shown in FIG. 1.
Figure 3:
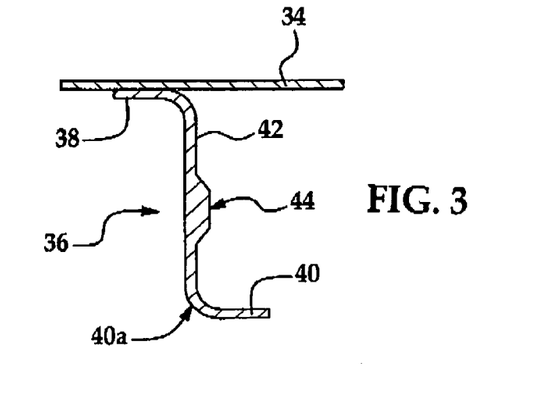
FIG. 3 is a sectional view taken along the line 3-3 in FIG. 1.

Referring first to FIGS. 1-3, a barrel shaped fuselage section 30 comprises an outer skin 34 formed over and fastened to a frame structure 32. The frame structure 32 comprises a plurality of longitudinally spaced, barrel frames 32a and longitudinally extending stringers 32b which pass through the barrel frames 32a. Each of the barrel frames 32a may comprise multiple frame sections 36 that are spliced together using any suitable means, such as without limitation, splice plates (not shown) and fasteners (not shown). In some applications however, half frame and full frame sections (not shown) may be possible.

Figure 4:
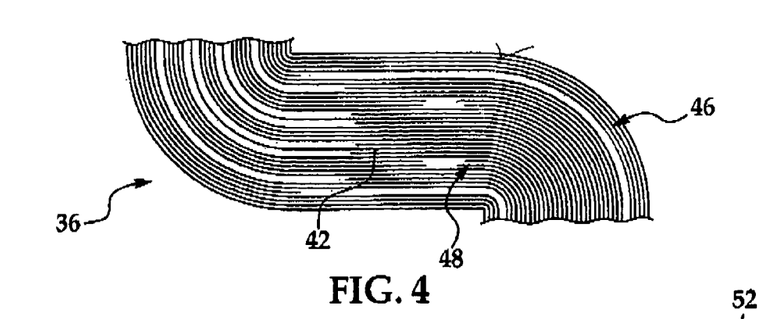
FIG. 4 is a sectional view showing a ply buildup for the frame section shown in FIG. 2.

As best seen in FIG. 3, the frame section 36 may have a generally Z-shaped cross section and includes an outer chord 38 connected to an inner chord 40 by a web 42. The outer and inner chords 38, 40, when viewed in cross section (FIG. 3), effectively form "legs" that extend traverse to the web 42. Thus as used herein, the terms "leg" and "legs" refer to one or more structural features such as, without limitation, caps or flanges that extend traverse to other features of a contoured structure such as, without limitation, a web. In the illustrated embodiment, the web 42 may include an optional reinforcing pad 44. The outer chord 38 forms a shear tie to which the skin 34 may be coupled and/or fastened. The outer chord 38 as well as one edge of the web 42 may include a plurality of spaced apart, mousehole-shaped cutouts 53 through which the stringers 32b extend. As will be discussed below, the frame section 36 is formed from laminated plies of a fiber reinforced synthetic resin, such as carbon fiber epoxy. As shown in FIG. 4, the frame section 36 may include a ply buildup comprising full plies 46 and partial plies 48 which are arranged and oriented to provide maximum structural performance while facilitating the use of a later discussed fabrication method that is both efficient and repeatable.

Figures 5, 6:
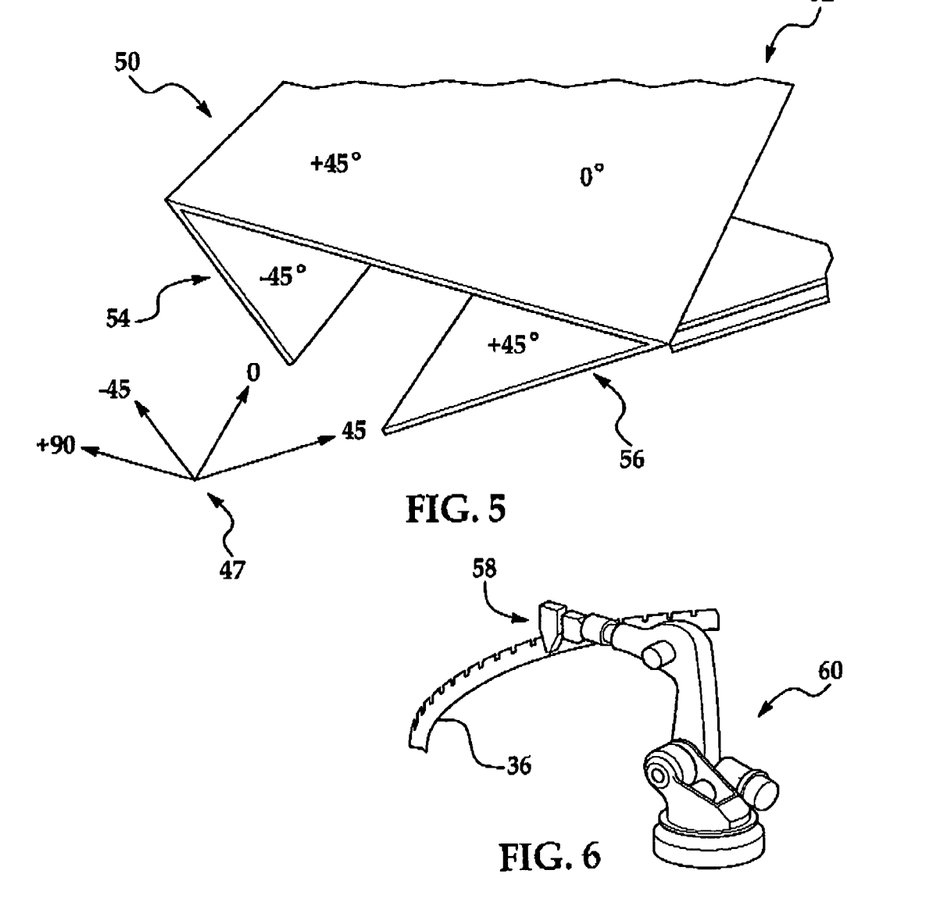
FIG. 5 is a perspective view of a flat ply stack used in the fabrication of the frame section shown in FIG. 2.
FIG. 6 is a perspective view of an AFP robotic machine used to place the stack of plies.
Figure 7:
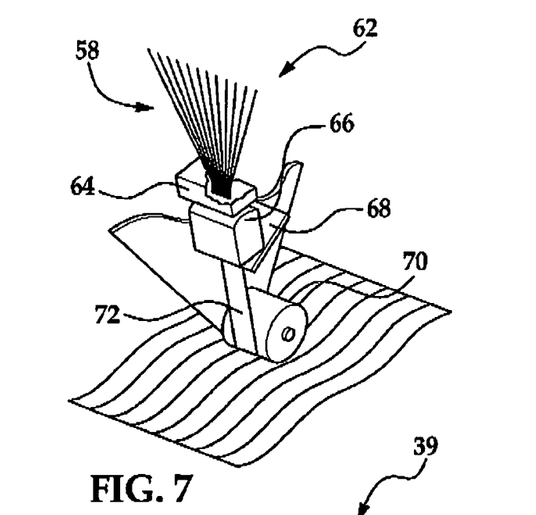
FIG. 7 is a perspective view of an AFP machine used as an end defector on the robot shown in FIG. 6.

Referring now to FIGS. 5-7, an AFP machine 58 may be used as an end effecter on a robot 60 to laydown fiber tows or strips of fiber pre-preg tape to form a flat ply stack 50. The AFP machine 58 may include combs 64 that receive incoming pre-preg tows 62 that pass through a ribonizer 66 before being severed by a tow cutter 68. The cut tows 72 pass beneath a compliant roller 70 that applies and compacts the tows 62 on a substrate (not shown) or an underlying ply layer (not shown). As best seen in FIG. 5, the AFP machine 58 may be used to laydown fiber tows 62 or tapes in which the fibers are oriented at preselected angles in a Cartesian coordinate system 47. In the illustrated example, the ply stack 50 includes fiber tows 52 oriented at 0 degrees, fiber tows 56 oriented at +45 degrees and fiber tows 54 oriented at −45 degrees. Not shown, but embedded in the ply stack 50 are fiber tows oriented at 90 degrees.

Figure 8:
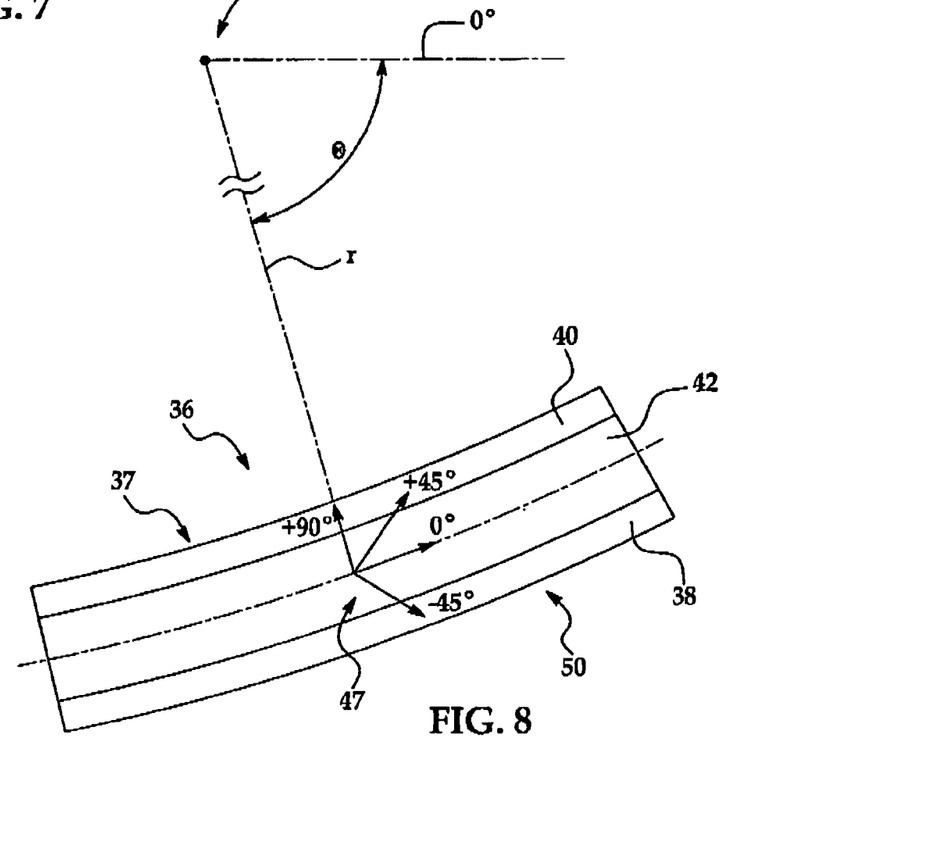
FIG. 8 is a diagrammatic view illustrating the polar and Cartesian coordinate systems used to define ply orientations in the frame section of FIG. 2.

FIG. 8 better illustrates the relationship between the orientation of a Cartesian coordinate system 47 in which the unidirectional fiber tows or tapes laid down in a ply stack 50, and a polar coordinate system that defines the contour, of the frame section 36. The contour of the frame section 36, designated by the numeral 37, may be defined by a radial coordinate "r" originating from a pole 39 and forming a polar angle θ with respect to a reference coordinate indicated by 0 degrees. Thus, each contoured feature by the frame section 30 may be defined by a value "r" (radial coordinate) at an angle θ. It should be note here that although the illustrated frame section 36 has a constant radius (curvature) and the web 42 has a constant gauge (thickness), the curvature of the frame section 36, the gauge of the web 42, the gauge of the inner chord 40 and the gauge of the outer chord 38 each may be variable along the length of the frame section 36.

In the illustrated example, the ply stack 50 is formed by multiple plies in which the unidirectional pre-preg fibers are oriented within a Cartesian coordinate system 47 that is tangentially aligned with the radial coordinate "r". As will be discussed below in more detail, in the illustrated example, fiber orientations of 0 degrees, −45 degrees, +45 degrees and +90 degrees are employed, however other angular orientations are possible, depending on a variety of factors, including the particular application, and the geometry of the frame section 36.

Figures 9, 10:
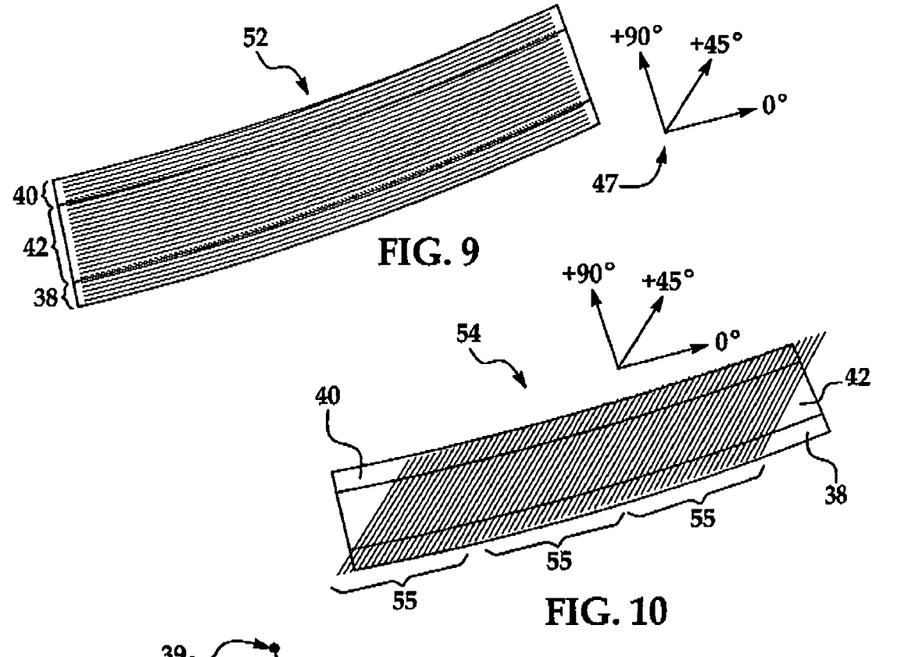
FIG. 9 is a plan view of a ply containing fibers oriented at 0 degrees.
FIG. 10 is a diagrammatic view illustrating plies respectively containing fibers oriented at 45 and 90 degrees, and illustrating the use of tow and tape wedges.

Attention is now directed to FIGS. 9-12 which illustrate fiber orientation in several plies of a flat ply stack 50. FIG. 9 illustrates a ply 52 in which the tows or tape strips are laid down by the AFP machine 58 with a 0 degree orientation, extending the entire length of the frame section 36. As used herein, "tape" refers to preimpregnated unidirectional fibers, and "tows" may comprise tape that is slit along it length into narrow bands which may be, for example and without limitation, 0.125, 0.25 or 0.5 inches in width. A "course" refers to tows applied as a band by the AFP machine 58. "Drops" refer to the AFP machine 58 discontinuing one or more tows, and may comprise the distance between adjacent tows or tape. A cut/add convergent zone means that a course terminates at a course of different orientation within the same ply, thereby creating areas of gaps and overlaps.

The 0 degree plies 52 may be formed by using the AFP machine 58 to "steer" the laydown of slit tape in which conformability and drop-offs determine the width of the ply 52. A full ply 52 is illustrated in FIG. 9, however a partial ply or a ply with drop-offs is possible as well. The sections of the ply 52 which later will be formed into the outer chord, inner chord and web are respectively designated by the numerals 38, 40 and 42. It should be noted here that in some applications, the plies forming the outer chord 40 may be formed using a separate band of tows or layer of tape that is precut to width and placed on later discussed tooling, rather than being laid down using the AFP machine 58.

The plies containing tows or tape oriented at angles other than 0 degrees are formed by side-by-side groups or segments 55, 74 of the tows/tapes that each has a tapered wedge shape. The segments 55, 74 may be formed using tape with up angle and drop allowance which determines the sides. For example, FIG. 10 illustrates a ply 54 formed by segments 55 in which the fiber orientation in each of the segments 55 is generally +45 degrees.

Figure 11:
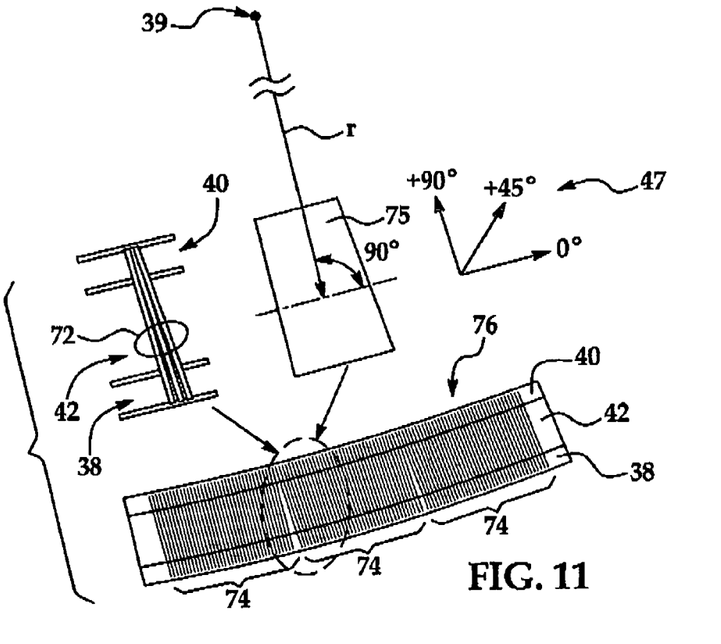
FIG. 11 is a perspective view of a flat stack of plies.

FIG. 11 illustrates a ply 76 formed by segments 74 arranged side-by-side, in which the fibers in each segment 74 are oriented generally at 90 degrees, substantially aligned with the angle of the radial coordinate "r" defining the contour 37 (FIG. 8) of the frame section 36. Where tows 72 are laid down to form the segments 74, the individual tows are angled in the direction of the curvature of the ply 76. The angled tows 72 are individually placed in side-by-side relationship to each other. Alternatively, the segments may be formed by tapered wedges 75 of fiber tape that are laid down in side-by-side relationship to each other by the AFP machine 58 or a similar apparatus.

Figure 12:
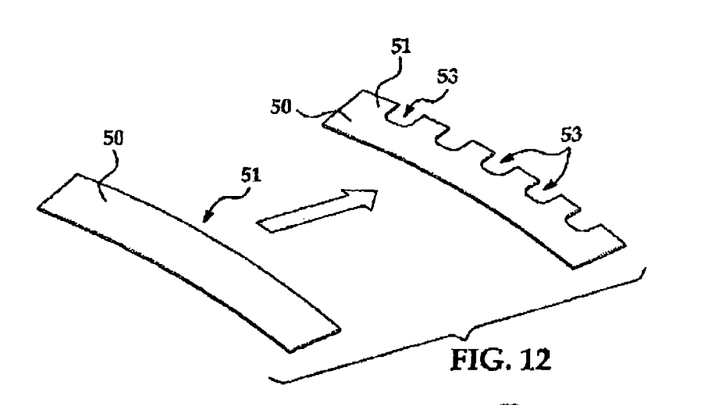
FIG. 12 is a perspective view similar to FIG. 11 but showing cut outs having been formed along one edge of the ply stack.

Referring now to FIG. 12, after the flat ply stack 50 has been fully placed, mousehole cutouts 53 may be created along one edge 51 of the ply stack 50. The cutouts 53 may be created using any of various techniques such as, by way of example and without limitation, using an NC controlled ultrasonic cutter (not shown).

In the illustrated example, the cutouts 53 provide openings through which the stringers 32b extend (FIG. 1). However, in other applications it may be desirable to provide similar cutouts 53 to reduce weight and/or reduce the possibility of ply wrinkling during subsequent fabrication processes.

Attention is now directed to FIGS. 13-17 which illustrate the formation of the inner chord 40 using a drape forming process. The ply stack 50 is placed on the upper flat surface 80a of a forming mandrel 80. The forming mandrel 80 includes a curved or contoured surface 80b which, in the illustrated example, forms a substantially 90 degree angle relative to the upper flat surface 80a. Any 0 degree plies that may be used to form the outer chord 40 are placed directly on the contoured surface 80b. An outer edge 50a of the ply stack 50 extends past the curved edge 80b and may be supported during ply placement by a layup shelf 86 that is subsequently moved to the position shown in FIG. 13. The forming mandrel 80 is supported on a vacuum bag tool 84, separated by a fiberglass breather 82. A vacuum bag 88 is placed over the ply stack 50 and forming mandrel 80. A breather 90 and a layer 92 of FEP (fluorinated ethylene propylene) may be placed between the bag 88 and the ply stack 50. The bag 88 can also have channels (not shown) on its inner surface, in which case the breather 90 is not required.

Figure 13:
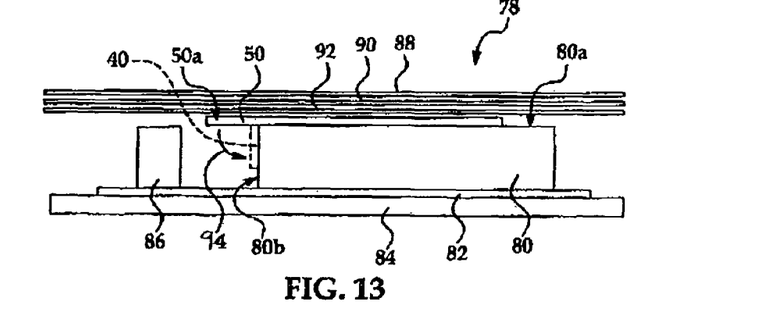
FIG. 13 is a cross sectional view showing a drape forming apparatus used to drape form an inner chord of the frame section.
Figure 14:
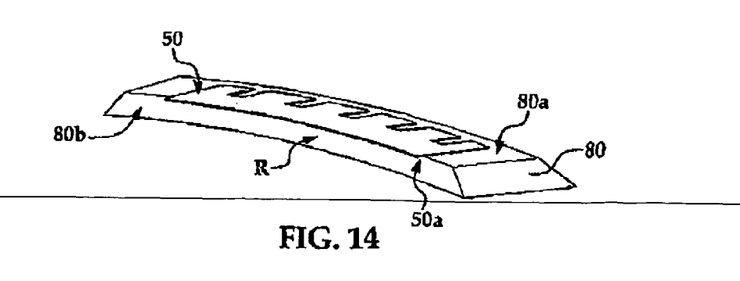
FIG. 14 is a perspective view of a flat ply stack positioned on a forming mandrel comprising part of the drape forming apparatus of FIG. 13.
Figure 15:
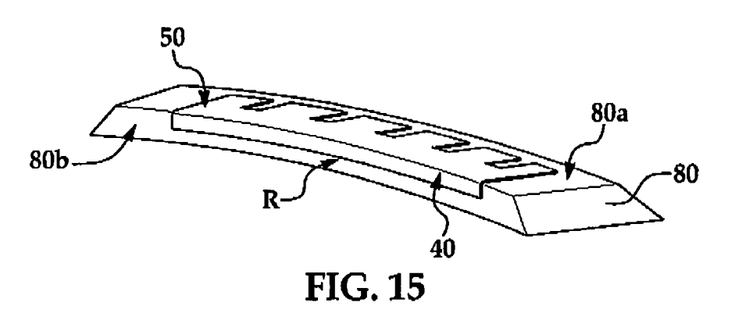
FIG. 15 is a view similar to FIG. 14 but showing the inner chord having been fully formed around the forming mandrel.

With the edge 50a of the ply stack 50 draped over the tool edge 80b, a vacuum is drawn in the bag 88 which applies pressure to the ply stack 50, causing the edge 50a to bend downwardly in the direction of the arrow 94 in FIG. 13 until the edge 50a lies substantially flat against and substantially assumes the contour of the forward face 80b of the forming mandrel 80. A ply stack edge 50a is thus formed into the inner chord 40 having a radius substantially identical to the radius R of the forward tool face 80b.

Figure 16:
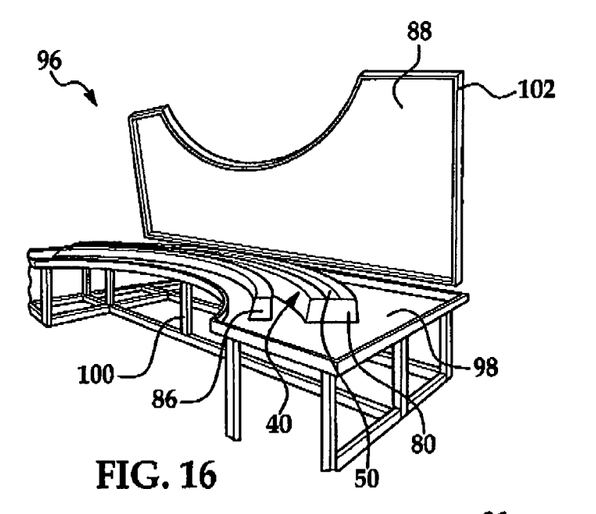
FIG. 16 is a perspective view of drape forming apparatus with a flexible membrane swung to an open position.
Figure 17:
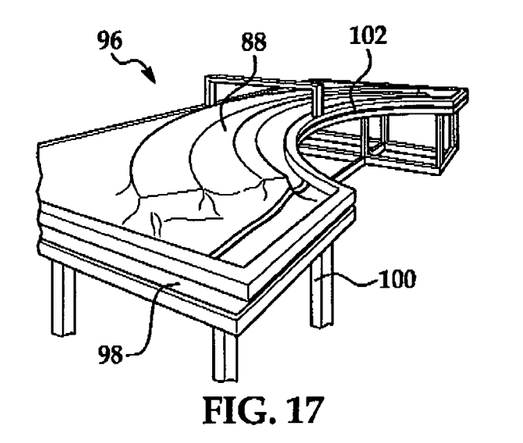
FIG. 17 is a view similar to FIG. 16 but showing the flexible membrane having been closed and drawn down around the tool assembly.

The forming process described above may be performed in a drape forming apparatus 96 shown in FIGS. 16 and 17. The bag 88 may comprise a gas impermeable membrane, formed, for example and without limitation, of silicone which is mounted in a frame 102 that is pivotally attached to a vacuum table 98 supported on legs 100. The vacuum table 98 includes ports or perforations (not shown) which allow air to be drawn through the table 98. The forming mandrel 80 along with the ply stack 50 and the layup shelf 86 may be placed on the vacuum table 98 with the frame 102 closed against the vacuum table 98.

As shown in FIG. 17, a vacuum system (not shown) may be used to evacuate the air in the sealed cavity formed by the frame 102 and table 98. Evacuation of this cavity results in the membrane 88 being drawn down over the forming mandrel 80, thus forming the edge 50a down over the front face 80b of the forming mandrel 80. The layup shelf 86 partially supports the membrane 38 during the formation process, thereby controlling and directing the force applied to the edge 50a of the membrane 88.

The inner chord 40 having been fully formed, the next step in the fabrication method is illustrated in FIGS. 18-21 in which the outer chord 38 is formed. The outer chord 38 may be fabricated by tension, hot drape forming using, for example and without limitation, the drape forming apparatus 124 shown in FIG. 19. The drape forming apparatus 124 includes a heated vacuum table 130 held in a lower frame 128 supported by legs 134. An upper, pivotal frame 126 includes a gas impermeable membrane 132 which may comprise silicone, for example. A tool in the form of a forming/cure mandrel 106 and a contoured block 112 are supported on the vacuum table 130 and are covered by the membrane 132 when the frame 126 is closed and sealed against the lower frame 128.

Figure 18:
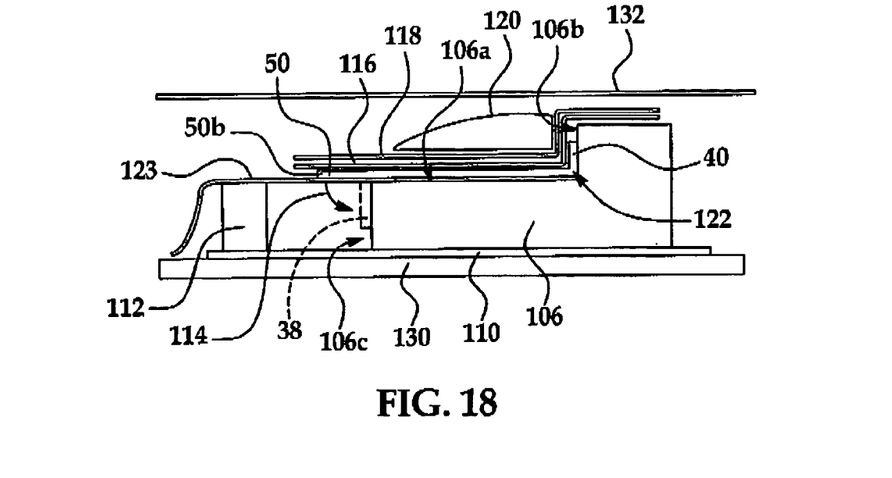
FIG. 18 is a sectional view of a hot drape forming apparatus for drape forming the outer chord of the frame section.
Figure 19:
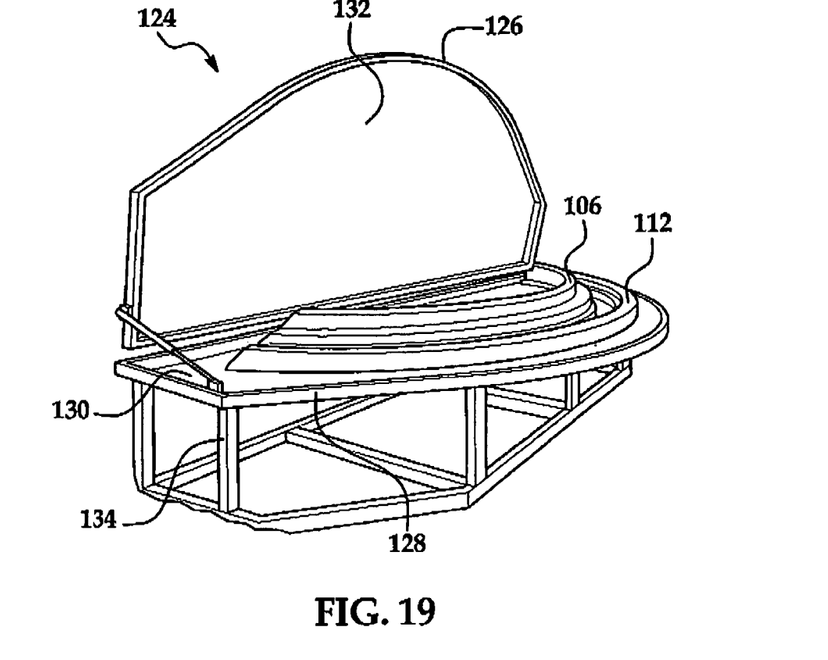
FIG. 19 is a perspective view of the hot drape forming apparatus shown in FIG. 18.

As best seen in FIG. 18, the forming/cure mandrel 106 includes a flat upper tool surface 106a which supports the ply stack 50. The second flat surface 106b on the forming/cure mandrel 106 extends upwardly from the tool surface 106a and engages the inner chord 40. The forming/cure mandrel 106 further includes a third surface 106c which extends downwardly from the tool surface 106a and is used to form the outer chord 38.

The forming/cure mandrel 106 is supported on the vacuum table 130. An optional breather 110 formed from fiberglass or other suitable material may be placed between the vacuum table 130 and the forming/cure mandrel 106. A contoured intensifier 120 may be placed over the ply stack 50 in order to assure that the radius 122 is fully maintained adjacent the inner chord 40. A ply 116 of a material such, but not limited to Teflon® as well as a breather 118 may be placed between the intensifier and the ply stack 50. An additional layer 123 of FEP may be placed between an edge of the forming/cure mandrel and the ply stack 50. The FEP layer 123 is draped over the block 112, which in combination, function to control the angle at which the bag membrane 132 applies pressure to the outer edge 50b of the ply stack 50 during the drape forming process.

The outer chord 38 may be hot draped formed over the forming/cure mandrel 106 which may then be heated within an oven or by other means such as infrared lamps, to a preselected temperature for example, of approximately 140 degrees F. A vacuum is drawn in the bag membrane 132 and held for preselected periods of time. During the tension controlled hot drape forming process, the fibers can slide within a ply as a result of the viscosity of the matrix resin decreasing due to heating. This allows the fibers to bunch or spread, or otherwise rearrange themselves, as needed. Maintaining tension under the stack 50 minimizes wrinkling. The radius intensifier 120 holds the inner chord radius 122 (40a in FIG. 3) while forming the outer chord 38.

Figure 20:
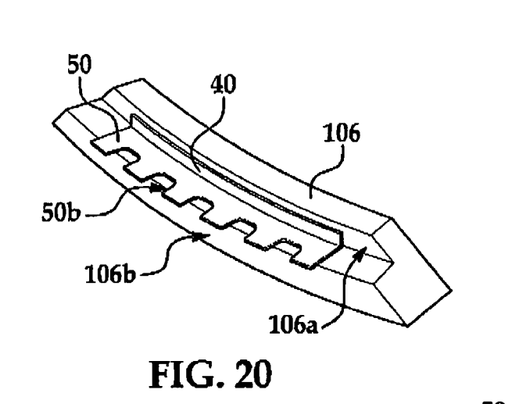
FIG. 20 is a perspective view of a forming/cure mandrel which comprises part of the drape forming tool assembly of FIG. 18, and depicting the partially formed frame section positioned thereon.
Figure 21:
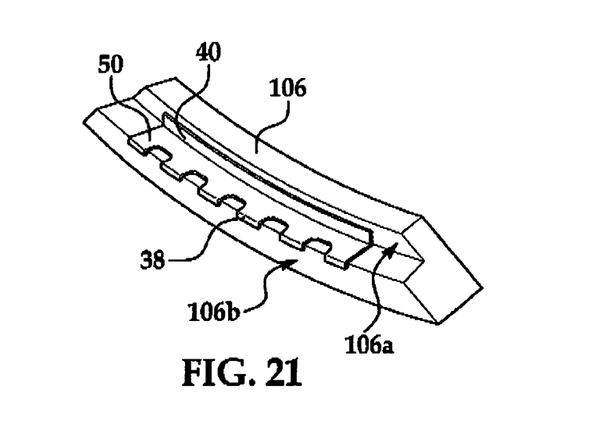
FIG. 21 is a view similar to FIG. 20 but showing the outer chord having been fully formed over the forming/cure mandrel.

FIG. 20 illustrates the partially formed ply stack 50 positioned on the forming/cure mandrel 106 with the formed inner chord 40 held against the tool surface 106a. The outer edge 50b of the ply stack 50 is cantilevered over the tool surface 106b. As shown in FIG. 21, when the membrane 132 is drawn down over the forming/cure mandrel 106, the membrane 132 applies pressure to the outer edge 50b at an angle that is partially controlled by block 112. The edge 50b of the ply stack 50 is then bent downwardly in the direction of the arrow 114 until it is fully formed against the tool surface 106c and forms the outer chord 38.

Figure 22:
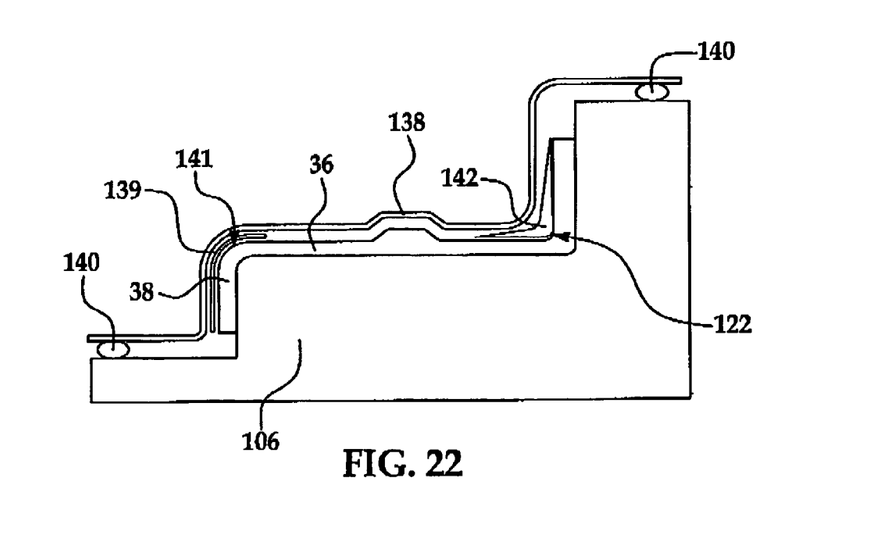
FIG. 22 is a sectional view of a forming/cure mandrel bag assembly used for curing the frame section.

When the inner and outer chords 38, 40 of frame section 36 having been formed, it is then necessary to cure the frame section 36, and in this connection, attention is directed to FIG. 22. The formed frame section 36 and forming/cure mandrel 106 are removed from the hot drape forming apparatus 124. A caul plate 139 may be placed over the outer chord 38 in order to assist in compacting the radius 141. Similarly, an intensifier 142 may be installed in order to aid in the compaction of the radius 122. A conventional vacuum bag 138 is placed over the frame section 36 and sealed by a seal 140 to the cure mandrel 136. A breather (not shown) and a peel ply (not shown) of FEP may also be placed between the forming/cure mandrel 106 and the bag 138.

Figure 23:
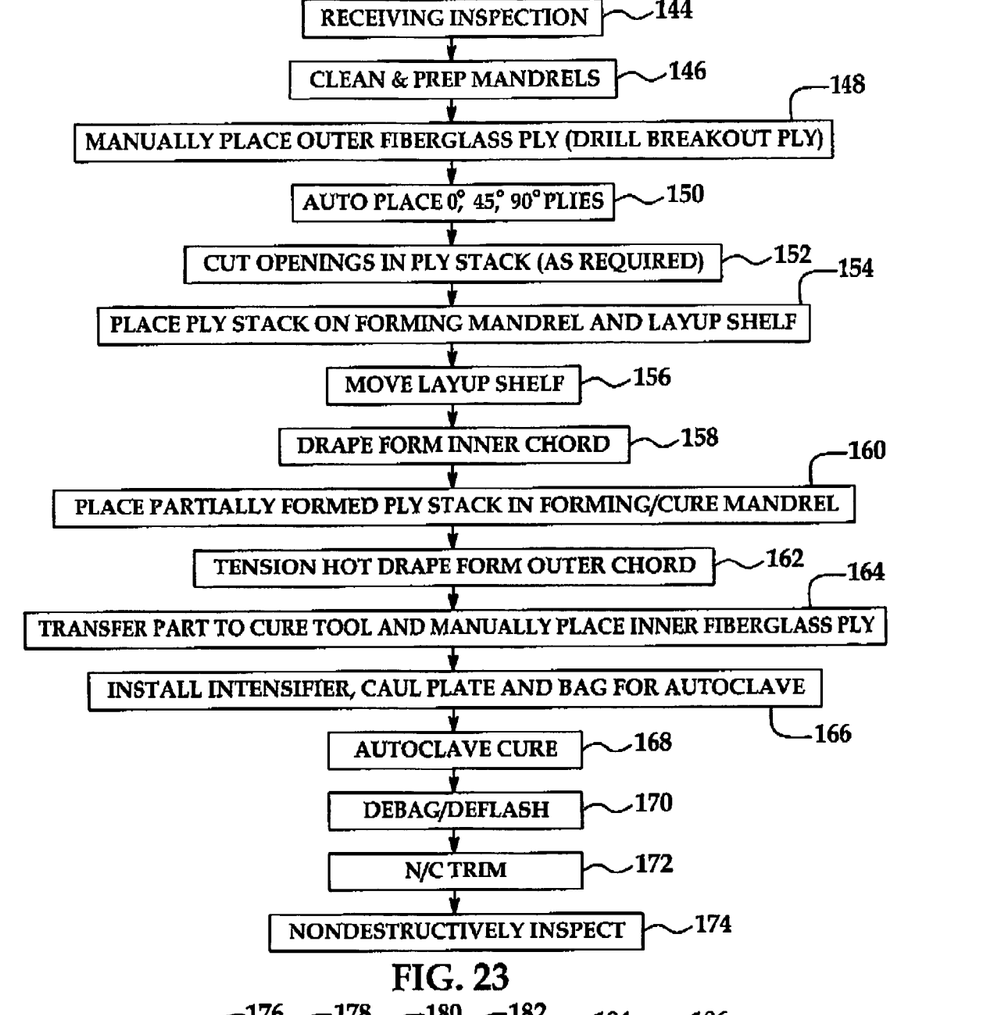
FIG. 23 is a flow diagram illustrating a method for fabricating continuous, contoured composite structures.

Attention is now directed to FIG. 23 which illustrates the overall steps used in the method for producing contoured composite structures. Raw materials, including pre-preg fiber tows and/or tape are received and inspected at 144. At 146, the previously discussed forming mandrel 80, and the forming/cure mandrel 106 are cleaned and prepared. Next, at 148, an outer fiberglass ply may be placed over the forming mandrel 80.

At step 150, all of the various plies in the stack 50 are laid down using one or more AFP machines 52. The flat ply stack 50 having been formed, the mousehole cutouts 53 are then put in the ply stack 50, as required at step 152. Next, at step 154, the ply stack 50 is placed on the forming mandrel 80 and layup shelf 86. Then at 156, the layup shelf 86 is moved to a position where it is used in the subsequent forming process. At step 158, the inner chord 40 is formed using the drape forming technique described above.

At step 160, the partially formed ply stack 50 is placed in the forming/cure mandrel 106. At 162 the outer chord 38 is hot draped formed on the forming/cure mandrel 106. Next, at step 164, the formed frame section 36 is transferred to the cure tool 136 and an inner fiberglass ply is placed over the frame. Next, at 166, the caul plate 139 and the intensifier 142 are installed, following which the assembly is vacuum bagged in preparation for autoclave curing. At 168 the frame section 36 is cured in an autoclave (not shown) following which, at 170, the cured, fully formed frame section 36 is debagged and deflashed. The frame section 36 may be trimmed at 172 using a numerically controlled cutter and the trimmed frame section 36 may then be inspected at 174 using conventional nondestructive evaluation techniques.

Figure 24:
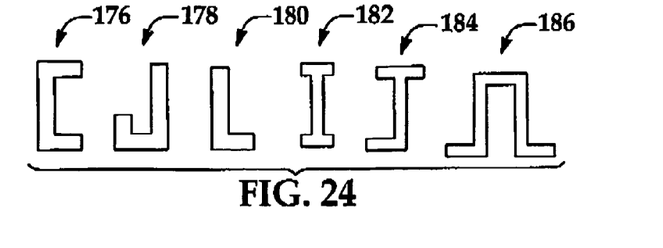
FIG. 24 illustrates cross sectional geometries of continuous composite structures that may be formed according to the disclosed embodiments.

While the disclosed embodiments illustrate use of the method to fabricate a contoured composite structure having a Z-shaped cross section, various other contoured structures are possible in which one or more legs extend outwardly from a structural feature such as a web. For example, as shown in FIG. 24, the disclosed embodiments may be employed to fabricate contoured, continuous structures having other leg configurations or cross sectional shapes, such as, without limitation, a C shape 176, a J shape 178, an L shape 180, an I shape 182, a modified J shape 184 and one or more forms of a U shape 186.

Figure 25:
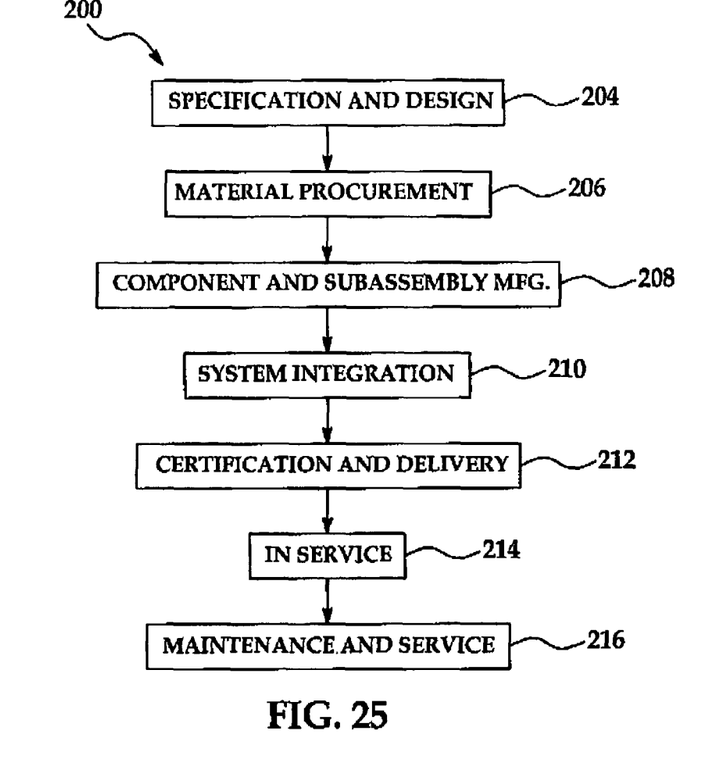
FIG. 25 is a flow diagram of aircraft production and service methodology.
Figure 26:
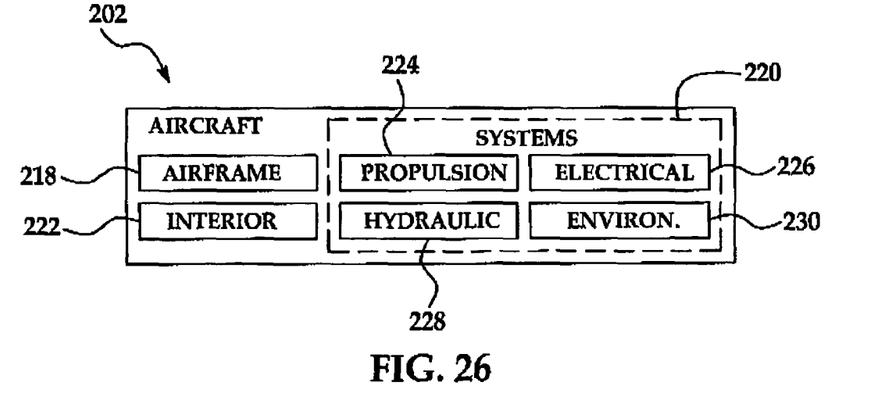
FIG. 26 is a block diagram of an aircraft.

Embodiments of the disclosure may find use in a variety of potential applications, particularly in the transportation industry, including for example, aerospace, marine and automotive applications. Thus, referring now to FIGS. 25 and 26, embodiments of the disclosure may be used in the context of an aircraft manufacturing and service method 200 as shown in FIG. 25 and an aircraft 202 as shown in FIG. 26. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 26, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the disclosure may be applied to other industries, such as the marine and automotive industries.

Systems and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of forming a composite part contoured along its length and having at least one leg, comprising:
   forming a ply stack of fiber reinforced pre-preg plies, the forming comprising:
      laying down a first set of individual tow segments of unidirectional fibers in a first ply layer, the segments extending a length of the part, including placing each of the segments in a preselected orientation related to a contour of the part, such that the segments are generally aligned to a radial coordinate defining the contour of the part, the contour defining at least a curvature; and
      laying down a second set of individual segments of unidirectional fibers in a second ply layer, the second ply layer positioned over the first ply layer, and the second set of individual segments forming a number of tapered wedges;
   placing the ply stack on a forming mandrel and a layup shelf such that a portion of the ply stack generally corresponding to the at least one leg contacts the layup shelf;
   moving the layup shelf from contact with the portion of the ply stack generally corresponding to the at least one leg;
   forming a first bend so as to create the at least one leg by bending a portion of the ply stack over the mandrel;
   placing the ply stack on the forming mandrel and a layup shelf such that a portion of the ply stack generally corresponding to the at least one leg corresponding to a first leg contacts a first portion of the layup shelf, and a second portion of the ply stack generally corresponding to a second leg contacts the forming mandrel, the forming mandrel configured in the shape of the second leg; and
   forming a second bend so as to create the second leg of the frame section by bending a portion of the ply stack along a second edge of the stack and to form a web between the first leg and the second leg, and the first leg, the web, and the second leg configured in a Z shape.

2. The method of claim 1, wherein laying down the individual segments is performed by an automatic fiber placement machine.

3. The method of claim 1, wherein forming the stack further includes laying down a third set of individual segments of unidirectional fibers along the length of the part, a fiber orientation of the third set of individual segments of individual fibers at approximately 45 degrees to the first set of individual segments.

4. The method of claim 1, further comprising compacting and curing the formed stack.

5. The method of claim 1, wherein the composite part comprises a frame section for an aircraft.

6. A method of forming a contoured composite frame section, comprising:
   forming a flat stack of fiber reinforced, pre-preg plies to form a ply stack, the forming comprising:
      laying down individual fiber tow segments in a first ply layer, the fiber tow segments being unidirectional and continuous, in a preselected polar orientation, said polar orientation comprising a longitudinal axis of each of the segments generally aligned to a radial coordinate defining the contour of the frame section, the contour defining at least a curvature, and the segments extending the length of the part;
      laying down a second set of continuous individual segments of unidirectional continuous fibers in a second ply layer, the second ply layer positioned over the first ply layer, the second set of individual segments extending generally perpendicular to an orientation of the first set of individual tow segments, and the second set of individual segments forming a number of tapered wedge segments; and
      laying down a third set of individual continuous segments of unidirectional fibers along the length of the part, a fiber orientation of the third set of individual segments of individual fibers at approximately 45 degrees to the first set of individual segments;
   cutting a number of cutouts along an outer edge of the ply stack;
   placing the ply stack on a forming mandrel and a layup shelf such that a first portion of the ply stack generally corresponding to a first leg of the contoured composite frame section contacts the layup shelf and a second portion of the ply stack generally corresponding to a second leg of the contoured composite frame section contacts the mandrel, the mandrel configured to form the second leg;
   moving the layup shelf from contact with the leg;
   forming a first leg of the frame section by placing and bending a portion of the stack over a tool following forming of said stack, wherein forming the first leg of the frame section is performed by bending the stack along a first edge of the stack, and further comprising forming a second leg of the frame section by bending the stack along a second edge of the stack, the second leg bent in an opposition direction than the first leg; and,
   compacting and curing the formed stack.

7. The method of claim 6, wherein individually placing the fiber segments includes tapering a pattern of the fibers in the segments of the second layer.

8. The method of claim 7, wherein individually placing the fiber segments is performed using an automatic fiber placement machine.

9. The method of claim 6, wherein individually placing the fiber segments is performed by placing fiber tape wedges in side-by-side relationship to each other in the second layer.

10. The method of claim 6, wherein the contoured composite frame section comprises a vehicle.

11. A method of fabricating a contoured composite structure with stringers, the structure characterized by a radial orientation, the method comprising the steps of:
   laying down a plurality of pre-preg plies so as to form a ply stack, the laying down comprising:
      laying down continuous unidirectional fiber tow segments in a first ply layer, the fiber segments generally aligned to a radial coordinate defining a curvature of the composite structure, the segments extending the length of the part;
      laying down continuous unidirectional fiber tow segments in a second ply layer, the second ply layer positioned over the first ply layer, the fiber segments of the second ply layer extending generally perpendicular to an orientation of the tow segments of the first ply layer, and the individual segments of the second ply layer forming a number of tapered wedge segments; and laying down continuous unidirectional fiber tow segments in a third ply layer, an orientation of the fiber segments of the third ply layer at approximately 45 degrees to the individual segments of the first ply layer;

cutting a number of cutouts along a first outer edge of the ply stack, the cutouts adapted to receive the stringers;

placing the ply stack on a forming mandrel and a layup shelf, the layup shelf positioned proximate to the forming mandrel such that a supported portion of the ply stack is supported by the layup shelf, the supported portion including the first outer edge of the ply stack having the number of cutouts, and the forming mandrel including a bend, a second outer edge of the ply stack positioned proximate the bend in the forming mandrel;

moving the layup shelf from the forming mandrel such that the layup shelf does not support the supported portion of the ply stack; and vacuum bagging and bending the ply stack so as to form a first leg and a second leg, the first leg located at the first outer edge of the ply stack, the second leg located at the second outer edge of the ply stack, the first leg and the second leg bending in opposite directions.

12. The method of claim 11, wherein laying down a plurality of pre-preg plies further comprises tapering a pattern of fibers in at least a segment of at least the second ply.

13. The method of claim 11, wherein laying down a plurality of pre-preg plies is performed using an automatic fiber placement machine.

14. The method of claim 11, wherein laying down a plurality of pre-preg plies further comprises placing a set of fiber tape wedges in a side-by-side relationship with each other in the second layer.

15. The method of claim 1 further comprising cutting a number of cutouts along an outer edge of the ply stack.

16. The method of claim 1 further comprising forming the second leg such that the first leg, the second leg, and a web portion of the ply stack form a z configuration.

17. The method of claim 1, wherein the second set of individual segments have an orientation different than the first set of individual tow segments.

18. The method of claim 1, wherein the second set of individual segments extend generally perpendicular to an orientation of the first set of individual tow segments.

\* \* \* \* \*